United States Patent [19]

Senyarich et al.

[11] Patent Number: 6,033,803

[45] Date of Patent: Mar. 7, 2000

[54] HYDROPHILIC ELECTRODE FOR AN ALKALINE ELECTROCHEMICAL CELL, AND METHOD OF MANUFACTURE

[75] Inventors: Stéphane Senyarich, Mornac; Jean-Michel Cocciantelli, Bordeaux, both of France

[73] Assignee: SAFT, Romainville, France

[21] Appl. No.: 08/956,444

[22] Filed: Oct. 23, 1997

[30] Foreign Application Priority Data

Oct. 24, 1996 [FR] France .................................. 96 12974

[51] Int. Cl.[7] ...................................................... H01M 4/62
[52] U.S. Cl. ........................ 429/212; 429/215; 429/218.2
[58] Field of Search ................................ 429/212, 218.2, 429/215

[56] References Cited

U.S. PATENT DOCUMENTS

| | | | |
|---|---|---|---|
| 4,339,512 | 7/1982 | Witherspoon et al. | 429/206 |
| 4,877,694 | 10/1989 | Solomon et al. | 429/27 |
| 5,346,781 | 9/1994 | Yuasa et al. | 429/59 |
| 5,527,638 | 6/1996 | Kinoshita et al. | 429/101 |
| 5,654,115 | 8/1997 | Hasebe et al. | 429/218 |
| 5,695,530 | 12/1997 | Hong et al. | 29/623.1 |

FOREIGN PATENT DOCUMENTS 6-333 568   12/1994   Japan .

OTHER PUBLICATIONS

Japanese Patent Abstract vol. 008, No. 123, JP 59 035360, Feb. 1984.
Patent Abstracts of Japan, vol. 008, No. 123 (E–249), Jun. 8, 1984 corresponding to JP 59 035360 A (Sanyo Denki KK) dated Feb. 27, 1984.
Japanese Abstract JP 06 223 822, "Positive electrode Plate for Lead–Acid Battery".

*Primary Examiner*—Maria Nuzzolillo
*Assistant Examiner*—J. O'Malley
*Attorney, Agent, or Firm*—Sughrue, Mion, Zinn, Macpeak & Seas, PLLC

[57] ABSTRACT

A negative electrode for an alkaline electrochemical cell. The electrode comprises an active material and a hydrophilic agent constituted by small cylindrical rods of polyolefin provided with hydrophilic groups. The mean length of the rods is less than 50 microns and the mean diameter thereof is less than 20 microns. A method of manufacturing a negative electrode in which hydrophilic rods are made by fragmenting long polyolefin fibers having a mean diameter of less than 20 microns by oxidizing them, with the rods being mixed with the active material and the mixture being applied to a current conductor.

24 Claims, 3 Drawing Sheets

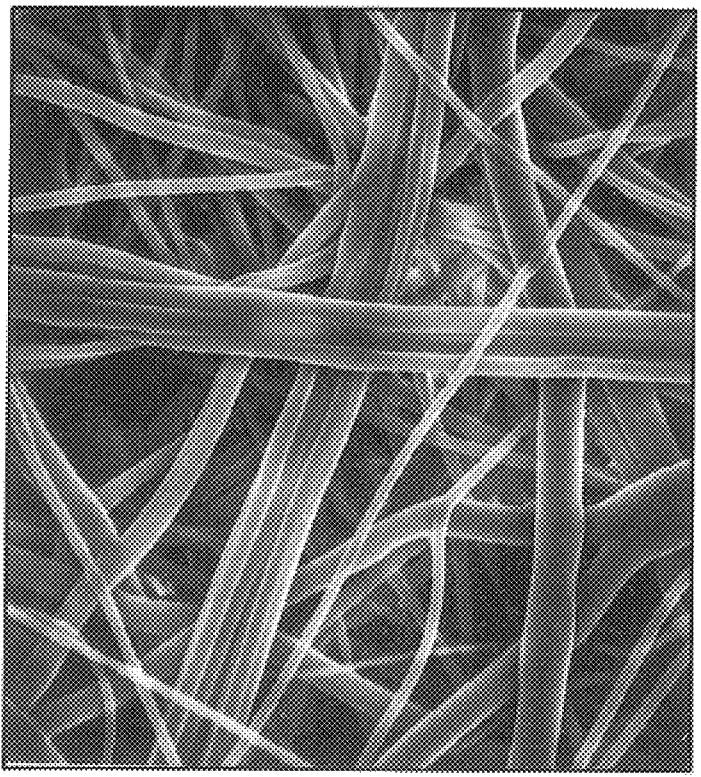
FIG_1
FIG_2

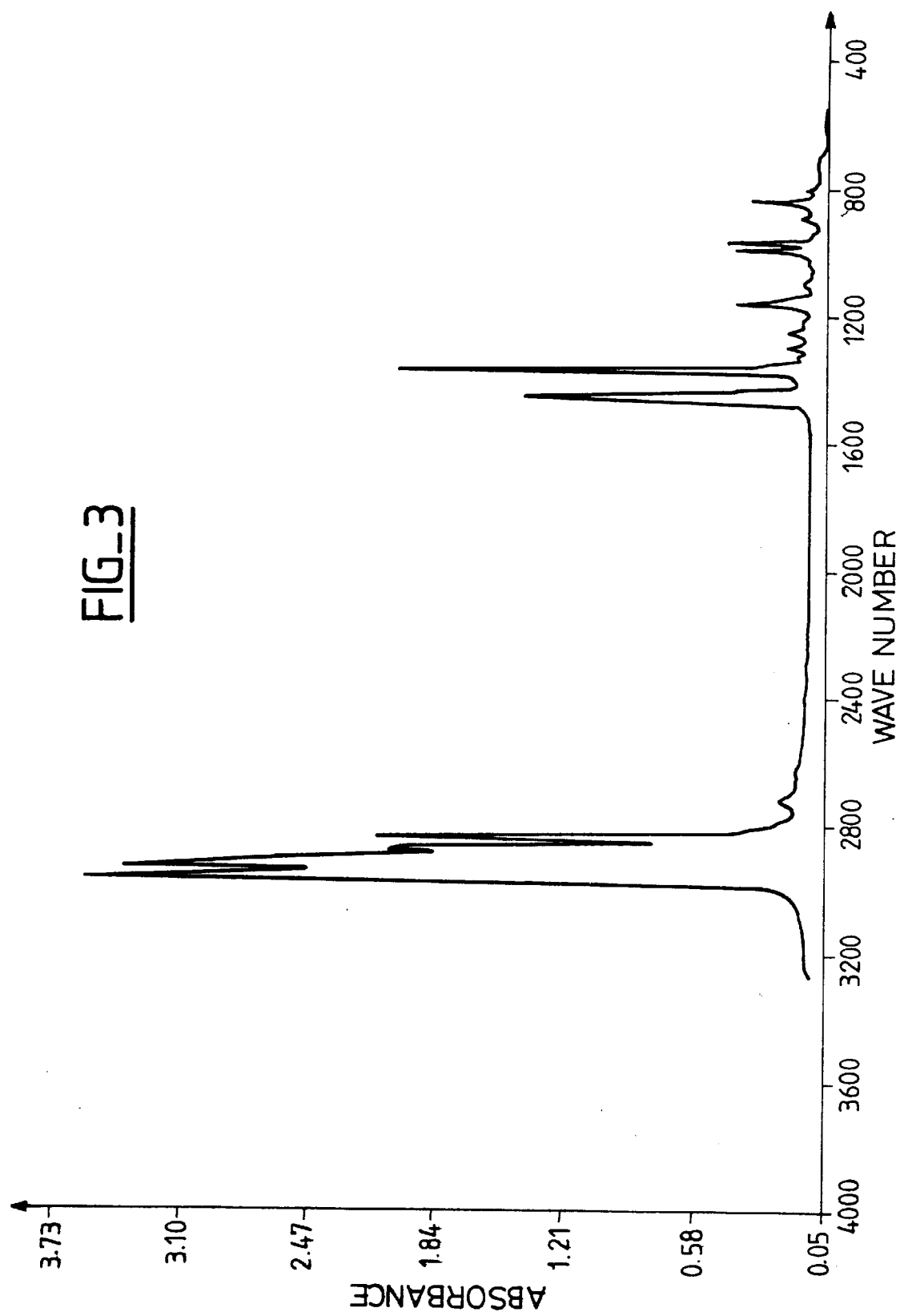
FIG_3

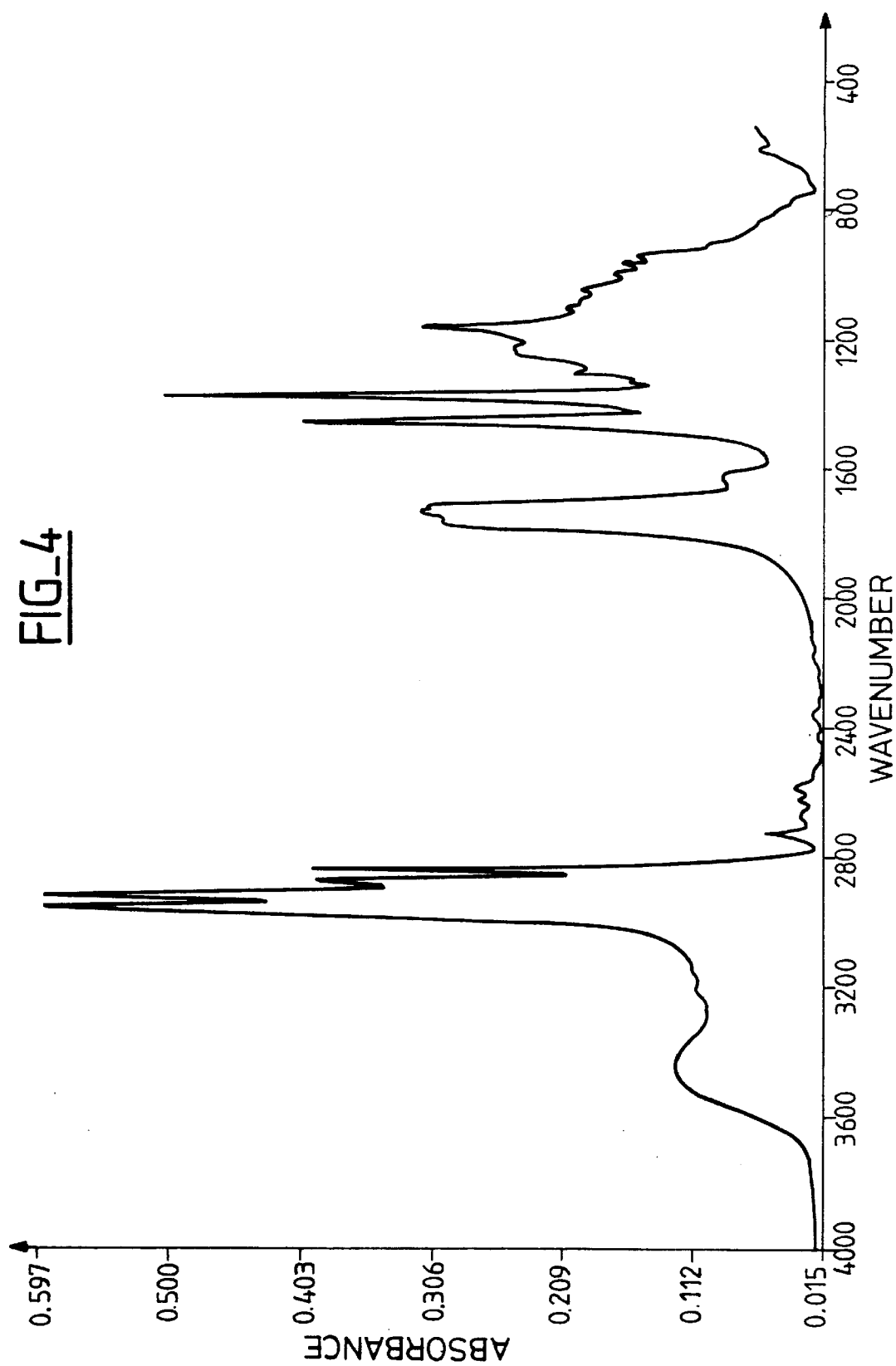
FIG_4

HYDROPHILIC ELECTRODE FOR AN ALKALINE ELECTROCHEMICAL CELL, AND METHOD OF MANUFACTURE The present invention relates to an electrode for an alkaline electrochemical cell, in particular an electrode based on a hydridable metal, and also to a method of manufacturing it. The invention also relates to a cell constituting an application thereof.

BACKGROUND OF THE INVENTION

It is known that electrochemical cells comprise two electrodes of opposite polarity with a separator being placed between them. The operation of alkaline electrochemical cells is based on oxidation-reduction reactions in the electrodes. The electrochemically active surface area of an electrode depends on the area that is wetted by the electrolyte. If the electrode is insufficiently wetted, then the active area is reduced, thereby increasing current density locally and thus reducing charged capacity. To obtain good performance as a storage cell, it is necessary for the electrodes to be thoroughly irrigated by the electrolyte.

Unfortunately, the negative electrodes that are usually used in alkaline cells are insufficiently hydrophilic, and this applies in particular not only to negative electrodes based on a hydridable metal but also to the negative electrodes of NiCd storage cells. In addition, the drying out of negative electrodes is accentuated by corrosion of the electrodes, leading to a "passivation" layer being formed thereon which absorbs a portion of the electrolyte.

Various techniques are known for increasing the hydrophilic nature of electrodes based on hydridable metal. A hydrophilic agent is generally added to the active material of the electrode.

For example, it is known to incorporate a hydrophilic polymer in the active material of the electrode. Nevertheless, that technique is no better than temporary since the polymer ends up by degrading in alkaline electrolyte and the negative electrode then loses its hydrophilic properties.

Document JP 0622 38 22 discloses the use of polyolefin hydrophilic fibers incorporated in said paste. The electrode is made more hydrophilic, but it is still not nearly hydrophilic enough. In addition, the resulting electrode is very friable when cut.

BRIEF SUMMARY OF THE INVENTION

The present invention provides a negative electrode for an alkaline electrochemical cell comprising a current collector and a paste including at least one active material and a hydrophilic agent constituted by small organic elements provided with at least one hydrophilic group.

Such an electrode is known from document JP 333568. In that embodiment, the small elements are constituted by porous beads having a diameter of about 100 microns (1 micron=1 micrometer 1 $\mu$m=$10^{-6}$ m). The resulting electrode is still insufficiently hydrophilic; in addition, the mechanical strength of the electrode is not satisfactory.

In the electrode of the present invention the small elements are made of polyolefin and are in the form of substantially cylindrical rods, with the mean diameter of the rods being less than 20 microns, and preferably being less than 10 microns, and with the mean length thereof being less than 50 microns.

This electrode has very good hydrophilic characteristics which are conserved over time, and it also has very good mechanical strength. It is not friable on being cut.

In a preferred embodiment, the mean diameter of the rods is less than 5 microns and the mean length thereof is less than 20 microns.

The proportion of hydrophilic agent preferably lies in the range 0.3% to 3% by weight of the paste.

The invention also provides an alkaline electrochemical cell comprising a nickel positive electrode, a negative electrode of the invention, and an aqueous electrolyte.

Also, adding the hydrophilic agent in accordance with the invention makes it possible to reduce self-discharge of the cell and to improve the mechanical strength of the electrodes used.

The present invention also provides the method of making said electrode. Said method comprises the following steps:
  preparing a paste comprising the active material of the electrode and a hydrophilic agent;
  applying said paste to the current collector; and
  drying.

The hydrophilic agent of the invention is obtained by fragmenting polyolefin fibers having a mean diameter of less than 20 microns and a mean length greater than 1000 microns so as to obtain rods having a mean diameter of less than 20 microns and preferably less than 15 microns, with a mean length that is less than 50 microns. By way of example, the material of these fibers is a polyolefin in which the number of carbon atoms in the corresponding monomer is less than 5. It preferably comprises polyethylene or polypropylene, and in even more preferred manner, polypropylene.

In a preferred embodiment of the invention, the mean diameter of said fibers is less than 5 microns.

In the method of the invention, the hydrophilic agent is obtained by oxidation. Oxidation makes it possible firstly to fragment the fibers into small rods having a mean length of less than 50 microns, and secondly to provide the small rods with hydrophilic groups, particularly on the surface. Fiber oxidation can be obtained by any method known to the person skilled in the art, for example a method selected from heat treatment, chemical treatment, X-ray irradiation, or photo-oxidizing treatment. The resulting hydrophilic group is a carboxyl group. The fibers may be prior grafted by at least one hydrophilic group before being subjected to oxidation, for example, a carboxyl group or a sulfo group.

The invention will be better understood and other advantages and features will appear on reading the following examples, given by way of illustrative and non-limiting example, and in which:
  Examples 1 to 4 show the characteristics of prior art electrodes; and
  Example 5 show the characteristics of an electrode of the invention.

BRIEF DESCRIPTION OF THE DRAWINGS

The examples are illustrated in FIGS. 1 to 4.

FIG. 1 is a scanning electrode microscope (SEM) picture of the non-oxidized polypropylene fibers of Example 5 taken using back-scattered electrons at a magnification of 500.

FIG. 2 is an SEM picture of oxidized particles of the invention from Example 5 taken with back-scattered electrons at magnification 1200.

FIG. 3 shows the infrared spectrum of said non-oxidized polypropylene fibers of Example 5, with wave number plotted along the abscissa (in $cm^{-1}$) and with absorbance being plotted up the ordinate (no units).

FIG. 4 shows the infrared spectrum of said oxidized particles of the invention from Example 5, with wave number being plotted along the abscissa (in cm$^{-1}$), and with absorbance being plotted up the ordinate (no units).

MORE DETAILED DESCRIPTION

Prior art electrodes and electrodes of the invention have been tested for the following characteristics:

hydrophilic nature;

mechanical strength; and lifetime of the storage cell.

Hydrophilic nature is quantified by measuring the percentage of electrolyte absorbed by the electrode. In particular, the electrode was left for four hours at ambient temperature in a solution of electrolyte and was then drained off. The electrolyte used was a potassium hydroxide solution at a concentration of 8.5 M. Electrolyte absorption was defined by calculating the difference in mass between the dry negative electrode and the same electrode after being soaked in the electrolyte, and then dividing said difference by the mass of the negative electrode when dry. An electrode is considered as being hydrophilic if its rate of electrolyte absorption is greater than 4%.

Mechanical strength was measured by the "drop" test. A 4 cm×6 cm electrode was dropped ten times in succession onto one of its faces, with the faces concerned being alternated (five drop tests on each face). The height of the drop was 50 cm. The resulting weight loss was measured as a percentage. An electrode is considered as having good mechanical strength if its weight loss is less than 0.5%.

COMPARATIVE EXAMPLE 1

A negative electrode for an Ni—MH storage cell was made in conventional manner by applying a paste onto a nickel foam or foil. The paste contained:

a hydridable alloy;

a dispersing agent;

a binder; and carbon.

An Ni—MH storage cell was made by associating the negative electrode with a positive electrode in which the inserted active material was nickel hydroxide, a polyamide separator, and a ternary electrolyte constituted by an aqueous mixture of potassium hydroxide KOH, sodium hydroxide NaOH, and lithium hydroxide LiOH. The negative electrode contained no hydrophilic agent.

The results are shown in Table I.

It can be seen that the electrode had good mechanical strength but that the hydrophilic nature and the lifetime of the cell were small (electrolyte absorption less than 3% and lifetime 500 cycles).

COMPARATIVE EXAMPLE 2

A storage cell was made as described in Example 1, with the negative electrode of Example 1 being replaced by a negative electrode in which the active material was a hydridable alloy and to which a hydrophilic polymer had been added (carboxy-methyl-cellulose). Its mass concentration within the paste was 1%.

The results are given in Table I.

It can be seen that the electrode had good mechanical strength and good hydrophilic nature. Nevertheless, the lifetime of the cell was not satisfactory (number of cycles <700). This result indicates that the hydrophilic polymer deteriorated during cycling and ceased to provide good hydrophilic nature to the negative electrode.

COMPARATIVE EXAMPLE 3

A storage cell was made as described in Example 1, in which the negative electrode of Example 1 was replaced by a negative electrode in which the active material was a hydridable alloy and there were added thereto beads of polymers grafted by hydrophilic functions sold under the name "DOWEX 50-WX8-250-400" by Dow Chemical. The mean diameter of the beads was about 100 μm, and their concentration by mass within the paste was 1%.

The results are given in Table I.

It can be seen that the storage cell had satisfactory lifetime, but that its hydrophilic nature was poor. In addition, the mechanical strength of the electrode was very poor (mass loss greater than 0.5%).

COMPARATIVE EXAMPLE 4

A storage cell was made as described in Example 1, but the negative electrode of Example 1 was replaced by a negative electrode in which the active material was a hydridable alloy and to which hydrophilic fibers had been added, the mean length thereof being about 2 mm (2000 μm), the mean diameter thereof being about 15 μm, and the mass concentration within the paste being 1%.

The results are given in Table I.

The lifetime of the cell was satisfactory, but the hydrophilic nature of the electrode was mediocre.

EXAMPLE 5

A storage cell was made as described in Example 1, but the negative electrode of Example 1 was replaced by a negative electrode whose active material was a hydridable alloy and to which there had been added oxidized particles in the form of small rods of oxidized polypropylene having a mean diameter of 4 μm and a mean length of 15 μm. The concentration by mass of said oxidized particles within the paste was 1%.

The rods were synthesized from non-woven polypropylene fibers themselves obtained by the "melt-blow" technique, which is well known to the person skilled in the art. Said fibers of polypropylene had a mean diameter of 4 μm and generally had a mean length of greater than 1000 μm.

FIG. 1 is an SEM picture of said non-oxidized polypropylene fibers at a magnification of 500. It can be seen that the fibers are long (at least 200 μm long).

FIG. 3 shows the infrared spectrum of said non-oxidized polypropylene fibers, with wave number being plotted along the abscissa (in cm$^{-1}$), and with absorbance being plotted up the ordinate (no units).

The small rods were synthesized from said fibers by a thermal oxidizing process at 145° C. for 12 hours. They were made of oxidized polypropylene having a mean diameter equal to 4 μm and a mean length equal to 15 μm.

FIG. 2 is an SEM picture of oxidized particles of the invention at a magnification of 1200. In comparison with FIG. 1, it can be seen that the particles are much shorter (in the range 4 μm to 30 μm).

FIG. 4 shows the infrared spectrum of said oxidized particles, with wave number being plotted along the abscissa (in cm$^{-1}$) and with absorbance being plotted up the ordinate (no units). Absorption bands can be seen to appear at 1730 cm$^{-1}$ (and at 3400 cm$^{-1}$) which are characteristic of the C=O bonds (and of the O—H bonds) of the carboxylic acid functions synthesized by oxidation.

The results are given in Table I.

Very good hydrophilic properties can be observed together with lifetime and mechanical strength that are highly satisfactory.

TABLE I

| Parameters | Ex. 1 | Ex. 2 | Ex. 3 | Ex. 4 | Ex. 5 |
|---|---|---|---|---|---|
| Hydrophilic agent | None | polymer | beads | fibers | rods |
| Electrolyte absorption % | 1.8 | 5.9 | 3.2 | 3.9 | 8.9 |
| Drop test mass loss % | 0.38 | 0.37 | 1.20 | 0.38 | 0.43 |
| Lifetime (cycles) | 500 | 550 | 700 | 700 | 850 |

Naturally, the present invention is not limited to the embodiments described, and numerous variants thereof are accessible to the person skilled in the art without going away from the spirit of the invention. In particular, without going beyond the ambit of the invention, it is possible to vary the composition of the paste and to include therein additives known to the person skilled in the art.

What is claimed is:

1. A negative electrode for an alkaline electrochemical cell, the electrode comprising
   a current collector and
   a paste including at least one hydridable active material and a hydrophilic agent constituted by polyolefin organic substantially cylindrical rods provided with at least one hydrophilic group, with the cylindrical rods having a mean diameter of less than 20 microns and a mean length of less than 50 microns,
   wherein the rods are of polyethylene or polypropylene.

2. A negative electrode according to claim 1, in which the mean diameter of the rods is less than 15 microns.

3. A negative electrode according to claim 1, in which the rods have a mean length of less than 20 microns and a mean diameter of less than 5 microns.

4. A negative electrode according to claim 1, in which the proportion of hydrophilic agent lies in the range 0.3% to 3% by weight of the paste.

5. A negative electrode according to claim 1, in which the hydrophilic group is a carboxylic acid.

6. A negative electrode according to claim 1, in which the rods are of polypropylene.

7. A negative electrode according to claim 1, wherein the hydrophilic groups are on the surface of the rods.

8. A method of manufacturing an electrode for an alkaline cell, comprising the steps of
   oxidizing polyolefin fibers having a mean diameter of less than 20 microns and having length of at least 200 microns to make hydrophilic rods,
   mixing the rods with a paste including a hydridable active material,
   applying the mixture to a current collector.

9. A method according to claim 8, wherein prior to oxidizing the fibers, at least one hydrophilic group is grafted thereon.

10. The method claim 8, wherein the fiber oxidizing is by heat treatment, chemical treatment, x-ray irradiation or photo-oxidizing treatment.

11. The method of claim 10, wherein the fiber oxidizing is by thermal oxidizing at 145° for 12 hours.

12. A method of manufacturing an electrode for an alkaline cell, comprising
   oxidizing long polyolefin fibers having a mean diameter of less than 20 microns to make rods,
   mixing the rods with a paste including an active material, and
   applying the mixture to a current collector,
   wherein, prior to oxidizing the fibers, at least one hydrophilic group is grafted thereon, in which said hydrophilic group is a carboxyl group or a sulfo group.

13. A method of increasing the hydrophilic characteristics of an electrode to a rate of electrolyte absorption greater than 4%, comprising:
   oxidizing polyolefin fibers having a mean diameter of less than 20 microns to make hydrophilic rods, and
   mixing the rods with a paste including an active material and forming an electrode therefrom.

14. A method of increasing the hydrophilic characteristics of an electrode to a rate of electrolyte absorption greater than 4% while providing for mechanical strength with weight loss of less than 0.5%, comprising:
   oxidizing polyolefin fibers having a mean diameter of less than 20 microns to make hydrophilic rods, and
   mixing the rods with a paste including an active material and forming an electrode therefrom.

15. A negative electrode for an alkaline electrochemical cell, the electrode comprising
   a current collector and
   a paste including at least one active material and a hydrophilic agent constituted by polyolefin organic substantially cylindrical rods provided with at least one hydrophilic group, with the cylindrical rods having a mean diameter of less than 20 microns and a mean length of less than 50 microns.

16. A negative electrode according to claim 15, in which the mean diameter of the rods is less than 15 microns.

17. A negative electrode according to claim 15, in which the rods have a mean length of less than 20 microns and a mean diameter of less than 5 microns.

18. A negative electrode according to claim 15, in which the proportion of hydrophilic agent is in the range of 0.3% to 3% by weight of the paste.

19. A negative electrode according to claim 15, in which the active material of the electrode is hydridable.

20. A negative electrode according to claim 15, in which the hydrophilic group is a carboxylic acid.

21. A negative electrode according to claim 15, in which the rods are of polyethylene or of polypropylene.

22. A negative electrode according to claim 15, in which the rods are of polypropylene.

23. A negative electrode according to claim 15, wherein the hydrophilic groups are on the surface of the rods.

24. A negative electrode for an alkaline electrochemical cell, the electrode comprising
   a current collector and
   a paste including at least one hydridable active material and a hydrophilic agent constituted by polyolefin organic substantially cylindrical rods provided with at least one hydrophilic group, with the cylindrical rods having a mean diameter of less than 20 microns and a mean length of less than 50 microns.

* * * * *